United States Patent
Harano (10) Patent No.: US 8,792,115 B2
(45) Date of Patent: Jul. 29, 2014

(54) SYSTEM AND CONTROL METHOD FOR SECURING INFORMATION BETWEEN IMAGE PROCESSING DEVICE AND IMAGE FORMING DEVICE

(75) Inventor: Yuzo Harano, San Mateo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1002 days.

(21) Appl. No.: 11/779,166

(22) Filed: Jul. 17, 2007

(65) Prior Publication Data

US 2008/0024835 A1   Jan. 31, 2008

(30) Foreign Application Priority Data

Jul. 28, 2006   (JP) ................................. 2006-207160

(51) Int. Cl.
    *G06F 3/12*   (2006.01)
(52) U.S. Cl.
    USPC ........................................ 358/1.15; 358/1.16
(58) Field of Classification Search
    USPC ................................ 358/1.1–1.16
    See application file for complete search history.

(56) References Cited

U.S. PATENT DOCUMENTS

| | | | | |
|---|---|---|---|---|
| 4,893,333 A | * | 1/1990 | Baran et al. | 379/100.11 |
| 5,982,994 A | * | 11/1999 | Mori et al. | 358/1.15 |
| 7,033,091 B2 | * | 4/2006 | Nakao | 400/76 |
| 7,154,628 B2 | * | 12/2006 | Davis | 358/1.16 |
| 7,362,457 B1 | * | 4/2008 | Shima | 358/1.15 |
| 2002/0032703 A1 | * | 3/2002 | Gassho et al. | 707/527 |
| 2003/0231320 A1 | * | 12/2003 | Tsunekawa | 358/1.2 |
| 2005/0036170 A1 | * | 2/2005 | Okuoka et al. | 358/1.16 |
| 2005/0057774 A1 | * | 3/2005 | Maruyama | 358/1.15 |
| 2006/0187481 A1 | * | 8/2006 | Hayakawa | 358/1.14 |

FOREIGN PATENT DOCUMENTS

| | | |
|---|---|---|
| JP | 2004007059 A | 1/2004 |
| JP | 2004-186810 A | 7/2004 |
| JP | 2005-038214 A | 2/2005 |
| JP | 2006-050407 A | 2/2006 |

* cited by examiner

*Primary Examiner* — Benny Q Tieu
*Assistant Examiner* — Michael Y Tzeng
(74) *Attorney, Agent, or Firm* — Canon U.S.A., Inc. IP Division

(57) ABSTRACT

A system includes an image processing device configured to output image data to an image forming device and the image forming device is configured to form an image based on the image data output from the image processing device, wherein information including a type of security is communicated between the image forming device and the image processing device.

28 Claims, 8 Drawing Sheets

| METHOD | CONTENT | SECURITY LEVEL |
|---|---|---|
| ERASING METHOD A | LOGICAL ERASURE | LOW |
| ERASING METHOD B | IN ADDITION TO LOGICAL ERASURE, WRITE "0" IN THE REGION | MEDIUM |
| ERASING METHOD C | IN ADDITION TO LOGICAL ERASURE, WRITE RANDOM VALUE IN THE REGION | HIGH |
| ERASING METHOD D | IN ADDITION TO LOGICAL ERASURE, WRITE RANDOM VALUES THREE TIMES IN THE REGION | VERY HIGH |

SYSTEM AND CONTROL METHOD FOR SECURING INFORMATION BETWEEN IMAGE PROCESSING DEVICE AND IMAGE FORMING DEVICE

BACKGROUND OF THE INVENTION

1. Field of the Invention

The present invention relates to a system which includes an image forming device and an image processing device.

2. Description of the Related Art

Conventionally, systems which have an image forming device and an image processing device have been known. For example, there is a system which includes a multi-function peripheral (MFP) capable of copying, scanning, faxing, and printing as the image forming device, and includes a print controller as the image processing device.

Recently, users of the devices have become increasingly aware of security with respect to data in such systems. For example, there is a secure print function in which the user is required to enter a password into the image forming device or the image processing device to print an image according to data, or a data erasing function in which data is erased so that the data is not recovered anymore.

Further, for example, as discussed in Japanese Patent Laid-Open No. 2004-007059, a MFP can have a function to password-protect a logical box in storing print jobs.

However, in the conventional systems, the image processing device and the image forming device operate independently from one another. Accordingly, the image processing device and the image forming device do not interact with one another to maintain security. For example, even if the data of the print job is erased using a secure erasing method in the image forming device, in the image processing device, the data of the print job can be stored in a reprintable form. That is, as a whole system, the image processing device and the image forming device do not collaborate in maintaining the security.

Similarly, even if the logical box for storing the print job can be securely maintained using the password in the image forming device, in the image processing device, the print job can be readily taken out. Also in such a case, as the whole system, the image processing device and the image forming device do not collaborate in maintaining the security.

SUMMARY OF THE INVENTION

The present invention is directed to provide a system configured to maintain security in which an image processing device and an image forming device collaborate with each other.

According to an aspect of the present invention, a system includes an image processing device configured to output image data to an image forming device and the image forming device is configured to form an image based on the image data output from the image processing device. The system further includes at least one communication unit configured to provide information including a type of security set at either the image processing device or the image forming device from either the image processing device or the image forming device, wherein whichever of the image processing device or the image forming device does not provide the information receives the information, and at least one selection unit configured to select a type of security to be set according to the information at whichever of the image processing device or image forming device receives the information.

It is noted that features of the present invention are not entirely described in the summary of the invention, and various combinations of claims and features described in the claims can be included within the scope of the invention.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EXEMPLARY EMBODIMENTS

Various exemplary embodiments, features, and aspects of the invention will be described in detail below with reference to the drawings. However, elements described in the exemplary embodiments are only examples, and the scope of the invention is not limited to the exemplary embodiments.

Figure 1:
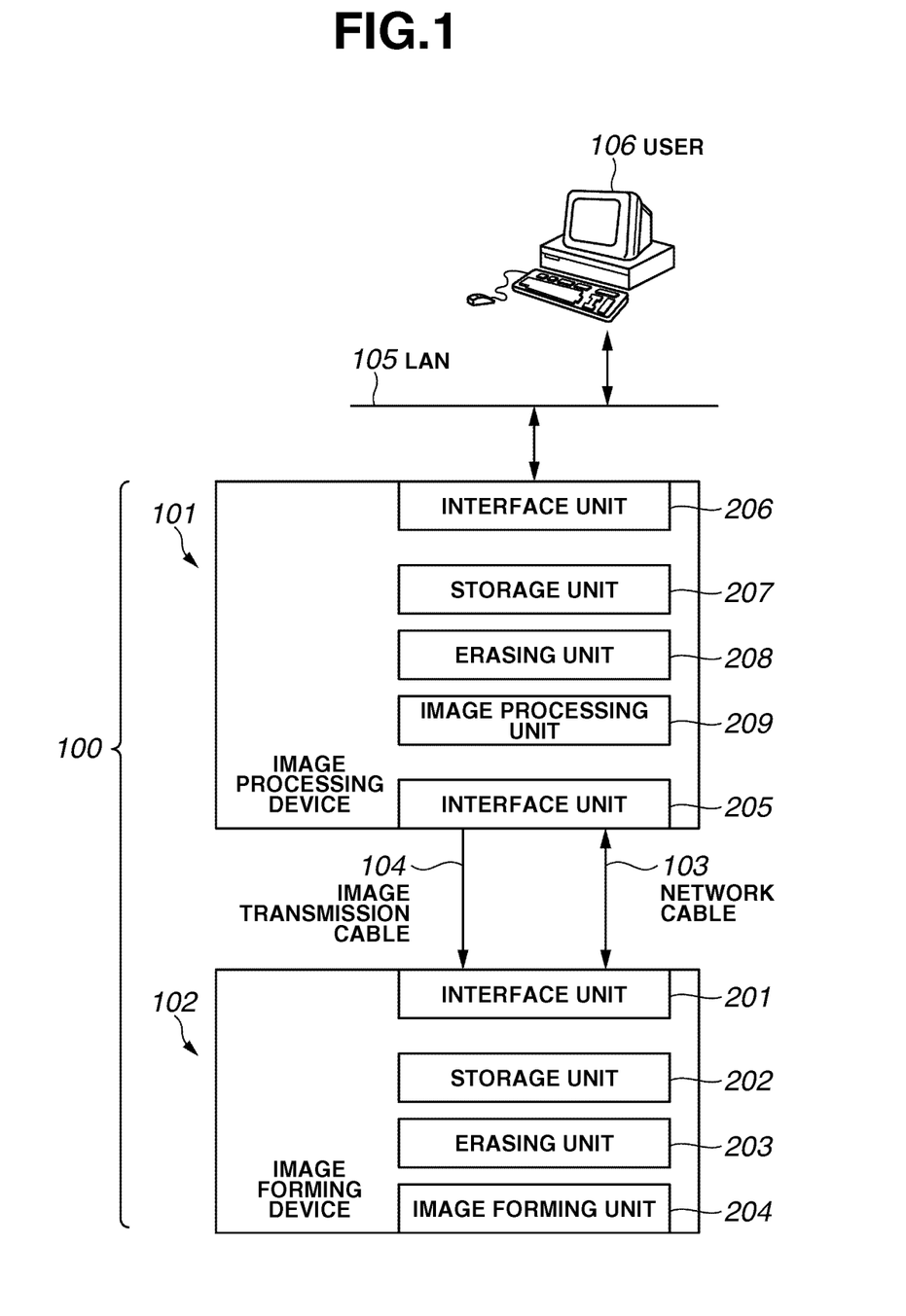
FIG. 1 is a view illustrating a whole system according to a first exemplary embodiment of the present invention.

FIG. 1 is a view schematically illustrating a system 100 according to a first exemplary embodiment of the present invention. In FIG. 1, the system 100 includes an image processing device 101 and an image forming device 102. The image processing device 101 and the image forming device 102 are connected with each other via a network cable 103 and an image transmission cable 104. The image processing device 101 is connected with a user terminal 106 via a local area network (LAN) 105 and is configured to receive data (hereinafter, referred to as print job) of a print job from the user terminal 106.

The image processing device 101 includes interface units 205 and 206 which function as communication units, a storage unit 207, an erasing unit 208, and an image processing unit 209. In the present embodiment, the image processing device 101 is a computer which has a print controller. The print controller receives a print job from a user, performs an image processing with respect to the print job, and generates image data in a format that enables forming of an image in the image forming device 102.

The interface unit 205 includes a network interface that communicates with the image forming device 102 via the network cable 103. The interface unit 205 further includes an image data transmission interface configured to transmit the image data generated in the image processing device 101 to the image forming device 102 via the image transmission cable 104. In the present embodiment, for the network interface, an interface complying with the universal Ethernet standard is employed and for the image data transmission interface, an interface utilizing a non-universal unique scheme established between the image processing device 101 and the image forming device 102 is employed.

The interface unit 206 is a network interface which receives a print job from the user terminal 106 via the LAN 105. In the present embodiment, for the network interface, an interface complying with the universal Ethernet standard is employed.

The storage unit 207 temporarily stores the print job received from the user to perform image processing and stores the print job so that the image can be reprinted after the print is completed. For example, a HDD can be used as the storage unit 207.

The erasing unit 208 securely erases the print job which is temporarily stored on the storage unit 207 to perform the image processing, or the print job stored on the storage unit 207 so that the image can be reprinted after the print is completed. The erasing method corresponds to an erasing method used in an erasing unit 203 of the image forming device 102. More specifically, the data is erased at a time the data becomes unnecessary, so that the data cannot be recovered.

Figure 3:
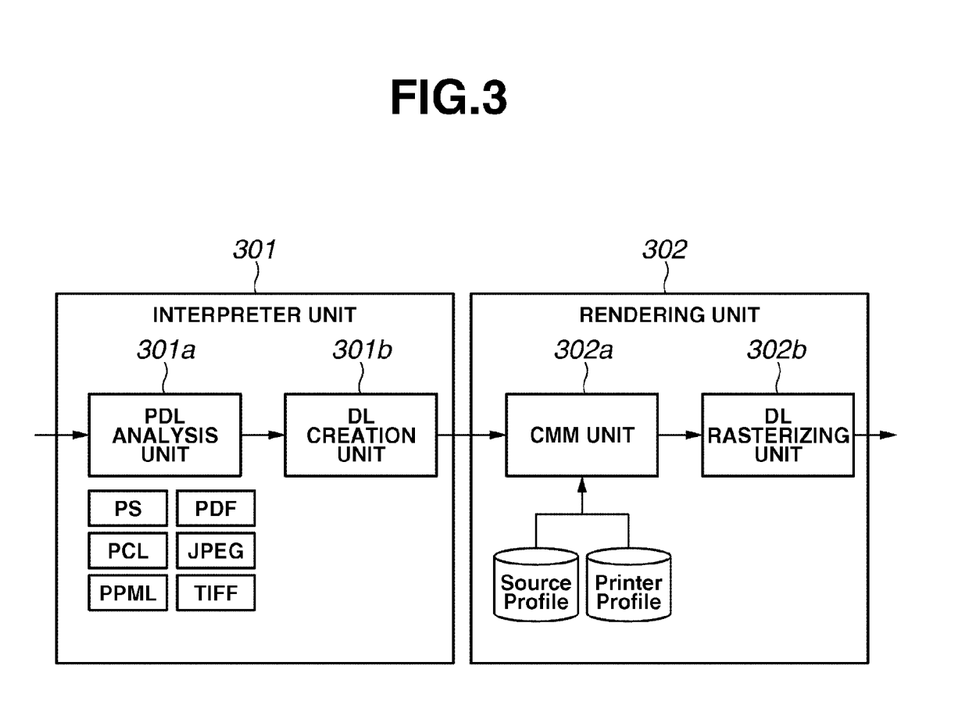
FIG. 3 is a view illustrating an image processing unit according to the first exemplary embodiment of the present invention.

The image processing unit 209 analyzes the print job received from the user, performs an image processing on the print job, and generates image data which can be formed as an image in the image forming device 102. Here, the image processing unit 209 is a raster image processor (RIP) which functions as the core of the print controller. As illustrated in FIG. 3 in detail, the image processing unit 209 includes an interpreter unit 301 and a rendering unit 302.

Next, a configuration of the image forming device 102 is described. The image forming device 102 includes an interface unit 201 which functions as a communication unit, a storage unit 202, an erasing unit 203, and an image forming unit 204. In the present embodiment, it is assumed that the image forming device 102 is the MFP which has functions of copying, faxing, scanning, and printing. However, the image forming device 102 is not limited to being an MFP, and any device that would enable practice of the present invention is applicable. The print function includes printing an image on a print sheet based on the image data transmitted from the image processing device 101.

The interface unit 201 includes a network interface which communicates with the image processing device 101 through the network cable 103. The interface unit 201 further includes an image data reception interface which receives the image data generated in the image processing device 101 from the image processing device 101 via the image transmission cable 104.

In the present embodiment, for the network interface, an interface complying with the universal Ethernet standard is employed and for the image data transmission interface, the interface utilizing the non-universal unique scheme established between the image processing device 101 and the image forming device 102 is employed.

The storage unit 202 temporarily stores the image data received from the image processing device 101 to form an image. For example, a HDD can be used as the storage unit 202. The erasing unit 203 securely erases the image data temporarily stored on the storage unit 202 for the image formation at a time the data becomes unnecessary, so that the image cannot be recovered. The image forming unit 204 prints on a sheet an image formed based on the image data transmitted from the image processing device 101. The image processing device 101 is a so-called printer engine.

Figure 2:
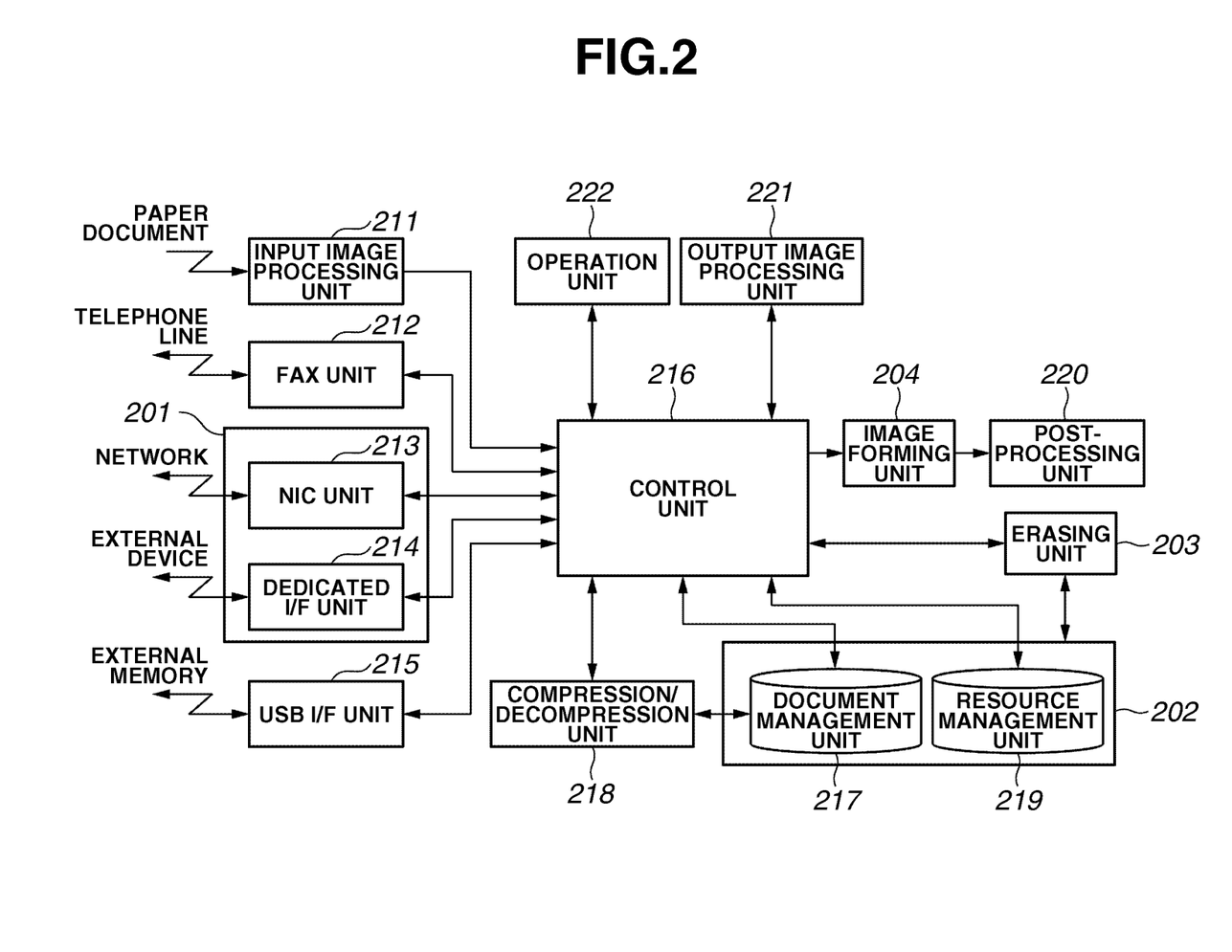
FIG. 2 is a view illustrating an image forming device according to the first exemplary embodiment of the present invention.

FIG. 2 is a block diagram illustrating the configuration of the image forming device 102 in detail. The image forming device 102, as described above, includes the storage unit 202 which can store data of a plurality of jobs, and has the copying function which enables printing of the data input by an input image processing unit 211 in the image forming unit 204 via the storage unit 202. Further, the image forming device 102 has the print function which enables printing of the data received from the image processing device 101 in the image forming unit 204 via the storage unit 202.

Generally, with respect to the image forming device 102, there are two types, that is, a full-color device and a monochromatic device. In many cases, the full-color device includes the configuration of the monochromatic device as basic parts except for color processing and internal data. Accordingly, in the present embodiment, in the descriptions of the image forming device 102, the full color device will be described.

The system can include both the MFP which includes a plurality of functions and a single function peripheral (SFP) which has only a printing function. Alternatively, the system can include only an image forming device of either type. Further, the system can include a plurality of image forming devices of either type. In any case, any configuration can be employed if the control according to the present embodiment is realized.

Returning to FIG. 2, the image forming device 102 includes the input image processing unit 211 which reads an image of, for example, a paper document, and processes image data of the read image, and a FAX unit 212 which transmits and/or receive image data using a telephone line, as represented by a facsimile. Further, interface unit 201 includes a network interface card (NIC) unit 213 which communicates image data or device information via a network cable, and a dedicated interface unit 214 which transmits/receives image data to/from the image processing device 101 via an image transmission cable. Further, the image forming device 102 includes a universal serial bus interface (USB/IF) unit 215 which transmits and/or receives image data to/from a universal serial bus (USB) device represented by a USB memory (e.g., removable memory).

A control unit 216 performs traffic control, for example, by temporarily storing image data according to usage of the image forming device 102 or determining a path.

The storage unit 202 includes a document management unit 217 and a resource management unit 219. The document management unit 217 includes a HDD and a memory which can store a plurality of types of image data. For example, the control unit 216 stores the plurality of types of image data in the document management unit 217, and reads the image data from the document management unit 217. The control unit 216 transfers the image data to an output unit of the image forming device 204, and controls an output process such as printing. Further, in response to a user's instruction, the control unit 216 controls the image data read from the document management unit 217 to transfer the data to a computer or another image forming device. The plurality of types of image data include the image data received from the input image processing unit 211, the image data of the FAX job input from the FAX unit 212, the image data received via the interface unit 201, and the image data input via the USB/I/F unit 215.

When the image data is stored in the document management unit 217 or the image data is read from the document management unit 217, if necessary, a compression or decompression process of the image data is performed by a compression/decompression unit 218. The resource management unit 219 stores commonly used various parameter tables such as fonts, color profiles, and gamma tables. The control unit 216 can obtain these parameter tables from the resource management unit 219 if necessary, store a new parameter table on the resource management unit 219, and modify and update the parameter table.

The erasing unit 203 securely erases the data which is temporarily stored in the storage unit 202 for the image formation at a time the data becomes unnecessary, so that the data cannot be recovered.

When the image data is received from the image processing device 101, an output image processing unit 221 performs image processing for the print on the data if necessary. Then, if needed, the output image processing unit 221 can store temporary image data or print-ready data (i.e., bitmap data for print or compressed data of the bitmap data) generated in the image processing, in the document management unit 217. The data for print is transmitted to the image forming unit 204 which forms an image. The sheet printed in the image forming unit 204 is transferred to a post-processing unit 220, and a sheet sorting process or a sheet finishing process is performed in the post-processing unit 220.

The control unit 216 performs control to smoothly transmit image data, and according to the usage of the image forming device 102, performs path switching as described below. Generally, the image data is stored as temporary data if necessary. However, in the description, only accesses which start from the document management unit or end at the document management unit are discussed and descriptions about other accesses are omitted. Further, processes performed in the compression/decompression unit 218, in the post-processing unit 220, and the control unit 216, are omitted, and only schematic flows are described.

Copy: input image processing unit→output image processing unit→image forming unit Fax transmission: input image processing unit→FAX unit Fax reception: FAX unit→output image processing unit→image forming unit Network scan: input image processing unit→NIC unit Scan to image processing device: input image processing unit→NIC unit Print from image processing device: dedicated I/F unit→output image processing unit→image forming unit Scan to external memory: input image processing unit→USB I/F unit Print from external memory: USB I/F unit→output image processing unit→image forming unit Box scan: input image processing unit→output image processing unit→document management unit Box print: document management unit→image forming unit Box reception: dedicated I/F unit→output image processing unit→document management unit Box transmission: document management unit→NIC unit Preview: document management unit→operation unit In addition to the above, various combinations of an e-mail service, web server function, and other various functions are possible, however, these descriptions are omitted.

The box scan, the box print, the box reception, and the box transmission refers to writing and/or reading data to/from a logical "box" in the document management unit 217. Thus, a storage region in the document management unit 217 is divided for each job or each user, and data can be stored in the respective regions. Then, the data can be input and/or output in/from the respective storage regions using a combination of a user ID and a password.

An operation unit 222 is used to select or operate the above-described various processing flows or functions. As the resolution of a display device of the operation unit 222 increases, a preview function used to preview the image data stored on the document management unit can be realized.

FIG. 3 is a view illustrating a configuration of the image processing unit 209 of the image processing device 101 in detail.

The image processing unit 209 functions as the RIP which simultaneously reproduces vector information such as characters, line drawings, figures or the like described in a page description language (PDL), or image information such as colors, patterns, pictures or the like, on a page. For that purpose, respective information (object information) in object units is rasterized in raster image data. The RIP can be mounted on the image forming device side as hardware. However, in the present embodiment, the RIP is formed by software and implemented by a CPU of the control unit.

The image processing unit 209 has two sections, that is, an interpreter unit 301 and a rendering unit 302. The interpreter unit 301 includes a PDL analysis unit 301*a* which analyzes PDL data and a display list (DL) creation unit 301*b* which generates an intermediate file called a display list from the analyzed PDL data. The rendering unit 302 includes a color matching module (CMM) unit 302*a* which performs color matching on the display list and a DL rasterizing unit 302*b* which rasterizes the display list into raster image data.

The PDL analysis unit 301*a* analyzes various types of input PDL data. Input formats include, but are not limited to, PostScript language and a printer control language (PCL). These languages are described using printer control codes for generating an image in page units. In addition to simple character codes, codes for graphic drawing, codes for photographic images or the like are included in the languages. Further, a portable document format (PDF) has been widely used in many fields. The PDF is directly transmitted to the image processing device 101 without using a driver. Further, the PDL analysis unit 301*a* can analyze a format for variable data print (VDP) named a personalized print markup language (PPML). The PDL analysis unit 301*a* can further analyze compression formats for color image data such as a joint photographic experts group (JPEG) and a tagged image file format (TIFF).

Various image data such as gray scale, RGB, and CMYK can be input into the CMM unit 302*a*. In a case of other color spaces, data is converted into a CMYK space using a color rendering dictionary (CRD) and color matching is performed on the converted data. In the CMM unit 302*a*, color adjustment with an ICC profile is performed. The ICC profile has two types, that is, a source profile and a printer profile. The source profile converts RGB (or CMYK) data into a standardized L * a * b * space, and further converts the L * a * b * data into a CMYK space suitable for a target printer.

The source file includes an RGB profile and a CMYK profile. If input image data is of an RGB type (JPEG, TIFF, etc.), the RGB profile is selected. If the input image data is of a CMYK type, the CMYK profile is selected.

The printer profile is prepared to conform to color characteristics of each printer. In a case of the image data of the RGB type, it is preferable to select Perceptual (color priority) or Saturation (brightness priority). In a case of the data of the CMYK type, Colorimetric (minimum color difference) is often selected to output an optimized image data. The ICC profile is generally formed in a look-up table format. In the source profile, if RGB (or CMYK) data is input, the data is uniformly converted into L * a * b * data. On the other hand, in the printer profile, the data is converted from L * a * b * data into CMYK data which matches with the printer. RGB data which does not require color matching is converted into CMYK data using a default color conversion and the converted data is output. CMYK data which does not require color matching is output without any conversion.

Figure 4:
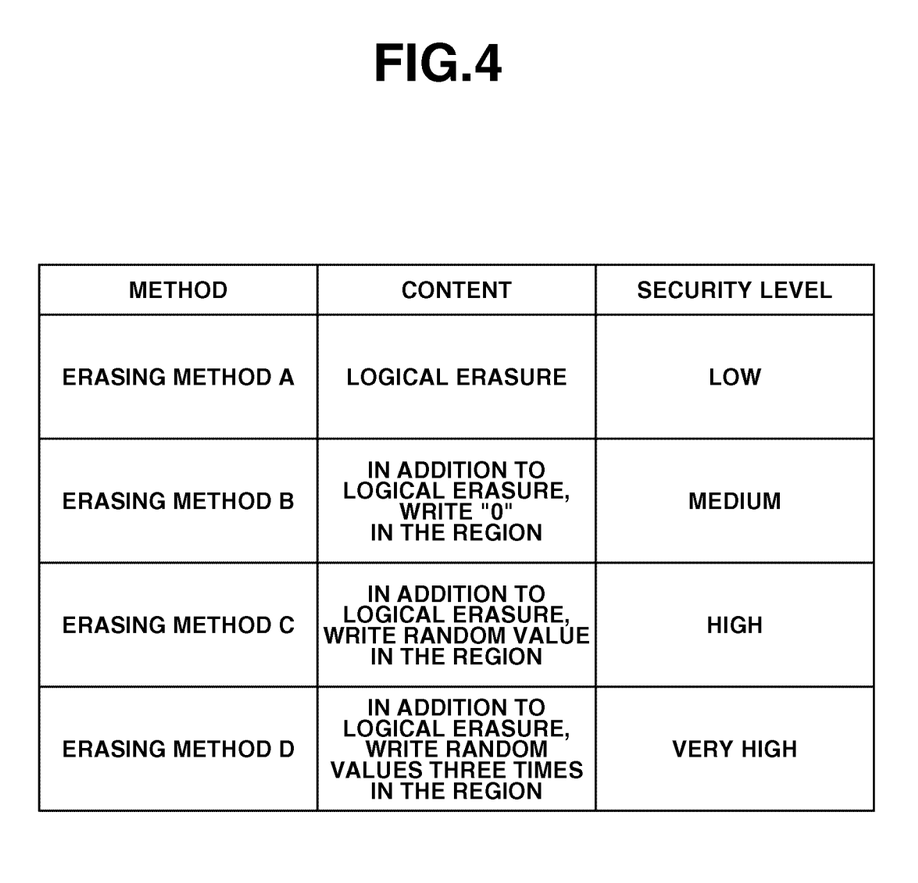
FIG. 4 is a view illustrating a table for explaining an example of data erasing methods according to the first exemplary embodiment of the present invention.

FIG. 4 is a table illustrating examples of data erasing methods used in the above-described erasing unit 203 of the image forming device 102 and the erasing unit 208 of the image processing device 101. In the present embodiment, the data erasing method itself is not described, and accordingly, in addition to these methods, any data erasing method can be employed.

An erasing method A is a most common data erasing method. According to the method, data in the storage units 202 and 207 is only logically erased and therefore by analyzing the storage units, the data can be recovered. The security level of this method is the lowest of the methods.

In an erasing method B, the data in the storage units 202 and 207 is not only logically erased, but "0 (zero of numeric character)" is written onto the entire region which is used by the data. Even if the storage units 202 and 207 are analyzed, it is relatively difficult to recover the erased data. The security level of this method is medium among the erasing methods. A specific value can be written onto the region other than zero.

In an erasing method C, the data in the storage units 202 and 207 is not only logically erased, but random values are written onto the entire region used by the data. Even if the storage units 202 and 207 are analyzed, it is difficult to recover the erased data. The security level of this method is high among the erasing methods.

In an erasing method D, the data in the storage units 202 and 207 is not only logically erased, but random values are written three times onto the entire region used by the data. The number of writing the values is not limited to three times if the writing is performed more than once. Even if the storage units 202 and 207 are analyzed, it is particularly difficult to recover the erased data. The security level of this method is the highest among the erasing methods.

As described above, there are various data erasing methods, and the security levels of the methods vary from low to very high.

As described above, the image forming device 102 does not collaborate with the image processing device 101, and the devices independently use the erasing methods. For example, even if the image forming device 102 uses the method D, the image processing device 101 typically uses another method, such as method A. In such a case, the security level of the image forming device 102 is very high. However, the security level of the image processing device 101 is low. Therefore, the security level of the system as a whole is low.

In the present embodiment, the security level of the image forming device 102 is associated with that of the image processing device 101. That is, the security level of the image processing device 101 is set to correspond to the security level of the image forming device 102 to realize a system which has an appropriate security level.

Figure 5:
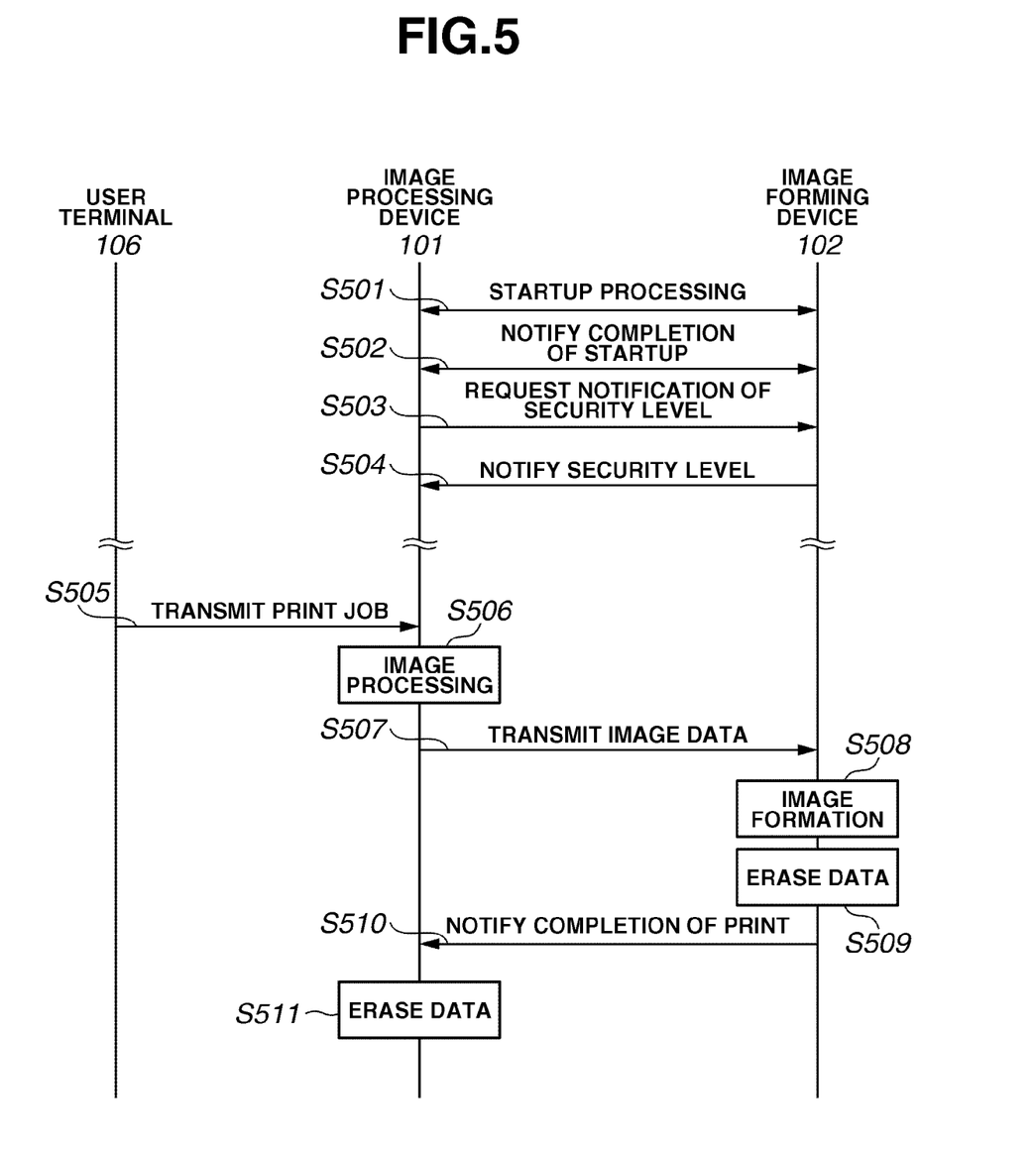
FIG. 5 is a sequential diagram illustrating an operation of an erasing unit according to the first exemplary embodiment of the present invention.

FIG. 5 is a sequential view illustrating an operation of the erasing units 203 and 208. First, between the image forming device 102 and the image processing device 101, a startup process is performed (step S501). The startup process is performed to enter into a standby state after both power supplies of the image forming device 102 and the image processing device 101 are turned on.

Then, the image forming device 102 and the image processing device 101 notify each other that the startup processes are completed and the devices are in the standby state (step S502). At this point, startup of the image forming device 102 and the image processing device 101 is completed.

Then, the image processing device 101 requests the image forming device 102 to notify the security level of the image forming device 102 (step S503). Alternatively, the image processing device 101 can request the image forming device 102 to notify which data erasing method is used in the image forming device 102. When the request is sent, the image processing device 101 transfers, to the image forming device 102, a request (security level notification request) requesting the image forming device 102 to notify the security level.

Then, the image forming device 102 notifies the image processing device 101 of the security information regarding the security level of the erasing unit 203 of the image forming device 102 (step S504). In the description of the present embodiment, as an example, the erasing method C is used in the erasing unit 203.

The user terminal 106 transmits a print job to the image processing device 101 (step S505). The image processing unit 209 generates from the print job the image data which is to be used in the image forming device 102 (step S506). At this stage, data relating to the print job, for example, temporarily stored data of the print job received from the user for image processing, or stored data of the print job which enables reprinting of the image after the print is completed, remains in the storage unit 207 of the image processing device 101.

Then, the image processing device 101 transmits the image data generated in the image processing unit 209 to the image forming device 102 (step S507). The image forming unit 204 of the image forming device 102 forms an image based on the received image data, and prints the formed image on a sheet (step S508). Then, the erasing unit 203 securely erases the data relating to the print job which remains in the storage unit 202 of the image forming device 102 using the erasing method C (step S509). Then, the image forming device 102 notifies the image processing device 101 that the print job is completed (step S510).

Finally, the image processing device 101 erases the data relating to the print job which remains in the storage unit 207 at a level contained in the security level information of the image forming device 102 which has been obtained in advance or at a level higher than the security level (step S511). That is, if the data erasing method C is used in the erasing unit 203, the erasing unit 208 also uses the erasing method C to erase the data relating to the print job which remains in the storage unit 207.

Therefore, with respect to the print job transmitted from the user, the image processing device 101 selects the data erasing method corresponding to the security level of the image forming device 102. Thus, the security levels of the whole system can be unified at an equivalent level.

In the present embodiment, the security level is notified from the image forming device to the image processing device. In another embodiment, the security level can be notified from the image processing device to the image forming device. In such a case, the image forming device erases the data relating to the print job at a level greater than or equal to the security level.

In a second exemplary embodiment of the present invention, a setting unit 210 which sets a password is provided in the image forming device 102. The rest of the configuration and operation of the image processing device 101 and image forming device 102 are is similar to that described above. As such, the same reference numbers are referred to and detailed descriptions of the configuration and operation are omitted herein.

In the previous embodiment, the print job is transferred from the user. In the present embodiment, the job transferred from the user corresponds to a box application job, and the box into which the job is input is password-protected to access the data in the box. The box application job is used to store image data in the storage unit 202 of the image forming device 102 using the box reception function of the image forming device 102.

Typically a user can enable a function for password-protecting of the box in the storage unit 202 of the image forming device 102 and can input image data into the box through a print controller. However, even if the user wants to set a password to the box to securely store the image data, the data relating to the box application job can be readily obtained using the print controller. Thus, the security level of the entire system is low.

Accordingly, in the present embodiment, when the box in the storage unit 202 is password-protected, the data temporarily stored in the storage unit 207 and the data stored for reprint is erased at a predetermined timing so that the data cannot be recovered after that.

Figure 6:
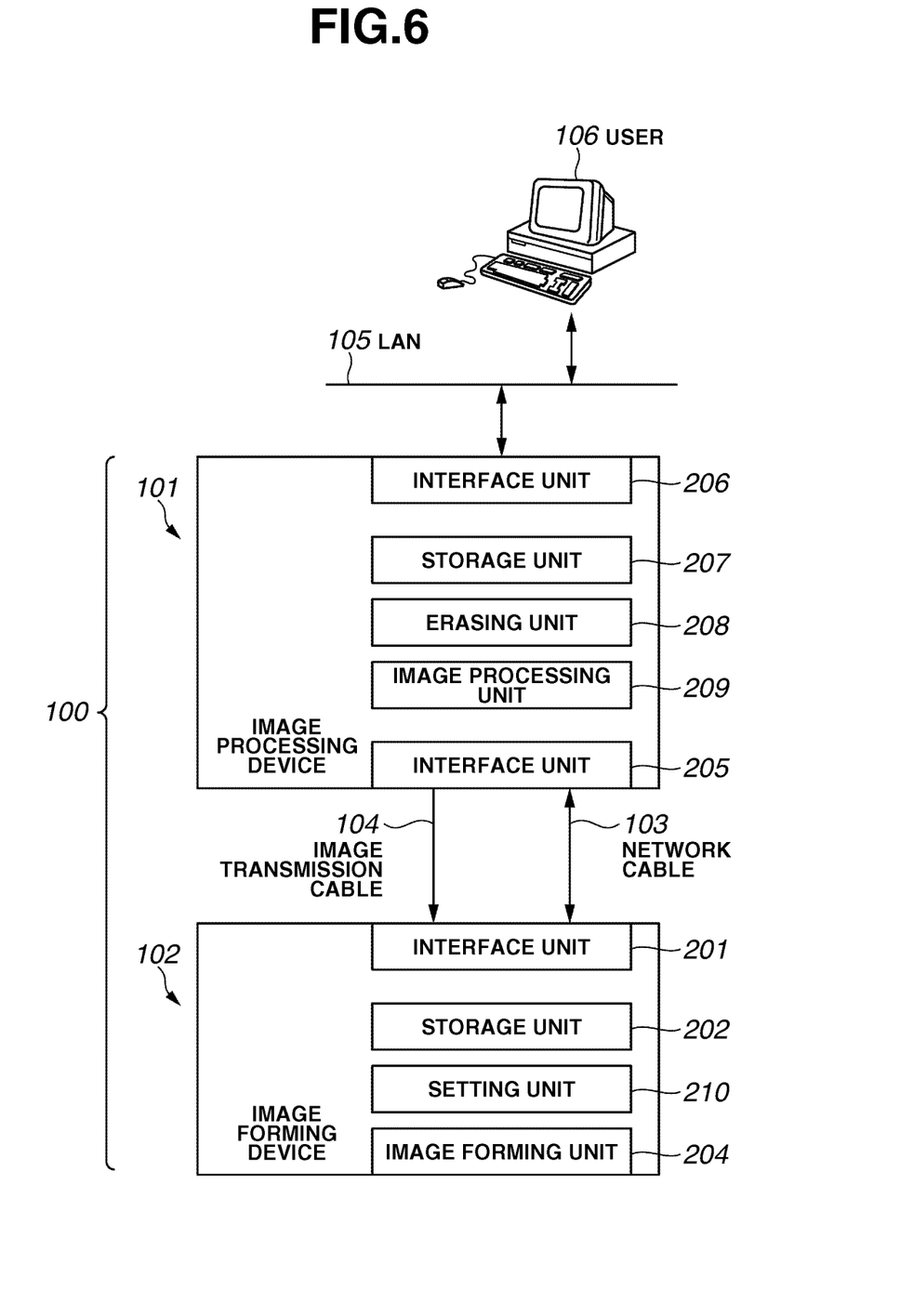
FIG. 6 is a view illustrating a whole system according to a second exemplary embodiment of the present invention.
Figure 7:
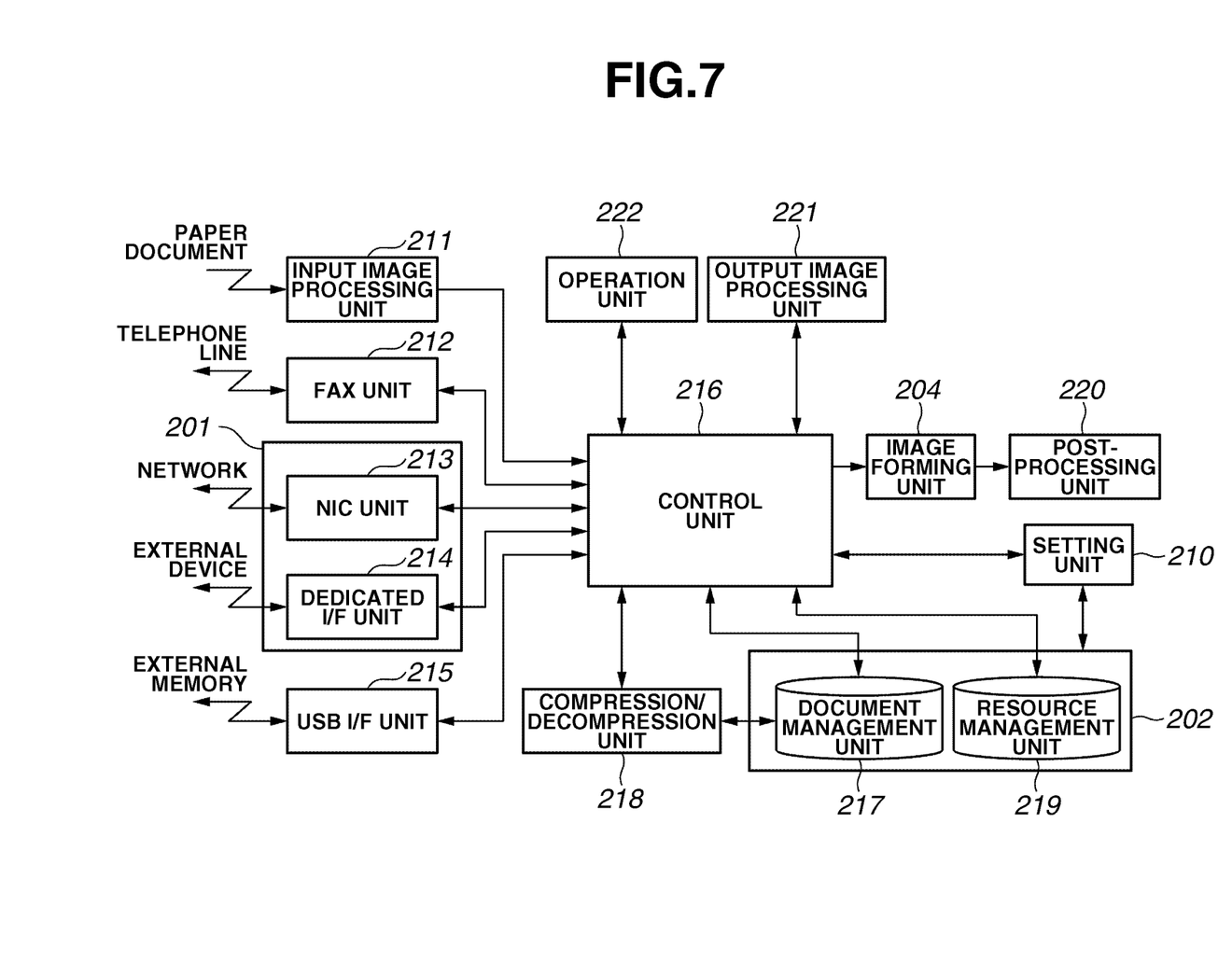
FIG. 7 is a view illustrating an image forming device according to the second exemplary embodiment of the present invention.
Figure 8:
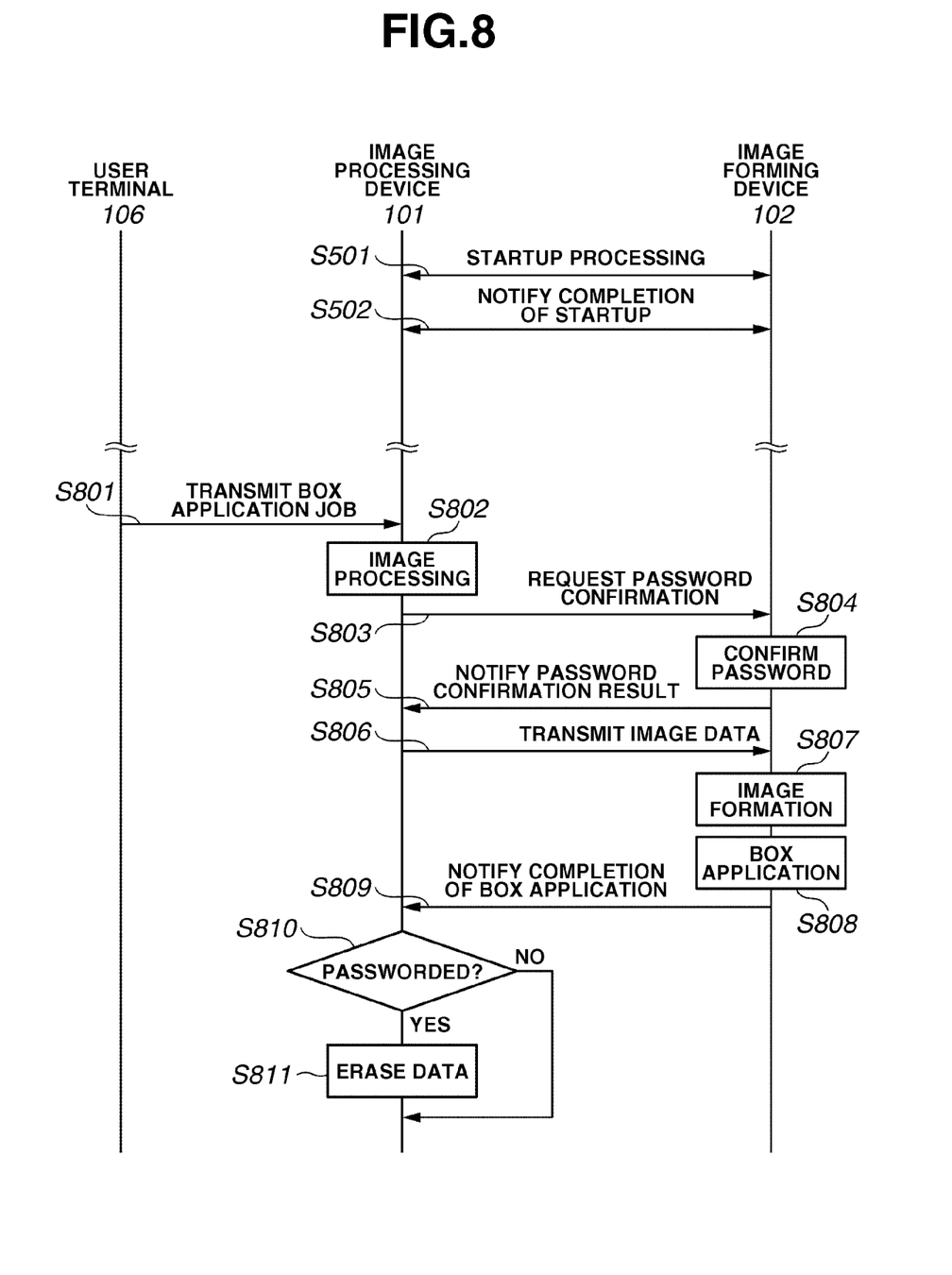
FIG. 8 is a sequential diagram illustrating an operation of an erasing unit according to the second exemplary embodiment of the present invention.

FIG. 6 is a view schematically illustrating the system according to the present embodiment. FIG. 7 is a view illustrating the image forming device 102 in detail according to the present embodiment. Unlike the image forming device 102 of FIG. 1, the image forming device 102 includes the setting unit 210. The setting unit 210 sets a password to the box in the storage unit 202 which stores the image data. FIG. 8 is a sequential view illustrating an operation of the erasing unit 208 which functions as the core in the present embodiment. Steps S501 and S502 in FIG. 8 are the same as steps S501 and S502 in FIG. 5, and thus are not described herein.

The user terminal 106 transmits a box application job to the image processing device 101 (step S801). The image processing unit 209 generates image data, which is to be used in the image forming device 102, from the box application job (step S802). At this stage, data relating to the box application job remains in the storage unit 207 to temporarily store the box application job received from the user for image processing and to store the image data to enable reprinting of the image after the print is completed.

Then, the image processing device 101 requests the image forming device 102 to notify whether the box into which the box application job is input is password-protected (step S803). When the notification is requested, the image processing device 101 transfers to the image forming device 102 a request (password confirmation request) requesting the image forming device 102 to confirm whether the box into which the job is input is password-protected. In response to the request from the image processing device 101, the image forming device 102 confirms whether the specified box is password-protected (step S804), and notifies the image processing device 101 of security level information indicating the confirmation result (step S805). In the present embodiment, it is assumed that the specified box is password-protected.

The image processing device 101 transmits the image data generated in the image processing unit 209 to the image forming device 102 (step S806). The image forming unit 204 of the image forming device 102 performs an image formation based on the received image data and prints the formed image on a sheet (step S807). The image forming device 102 inputs the image data which relates to the box application job into the box specified by the user (step S808). Then, the image forming device 102 notifies the image processing device 101 that the box application job is completed (step S809).

The image processing device 101, based on the security level information notified at step S805, determines whether the box into which the job is input is password-protected (step S810). If the box into which the job is input is password-protected, it is determined that the security level is medium, and the data relating to the box application job which remains in the storage unit 207 is erased (step S811). In the present embodiment, the erasing unit 208 employs the erasing method B, and erases the data relating to the box application job which remains in the storage unit 207. On the other hand, if the box into which the job is input is not password-protected, the data relating to the box application job which remains in the storage unit 207 of the image processing device 101 is not erased.

If the box into which the job is input is password-protected, the password itself can be notified at step S805. Thus, while the data relating to the box application job remains in the storage unit 207 of the image processing device 101, the same password can be set to the data to match the security levels.

As described above, in the present embodiment, with respect to the box application job input by the user, the image processing device 101 employs the data erasing method which corresponds to the security level of the image forming device 102. Thus, similar to the previous embodiment, the image forming device 102 collaborates with the image processing device 101 to unify the security level of the entire system.

That is, based on the security level of the image forming device 102, the security level of the image processing device 101 is set. Accordingly, the security of the entire system can be unified.

In the present embodiment, whether the password is set is notified from the image forming device to the image processing device. In another embodiment, the image processing device can notify the security level to the image forming device. In such a case, if the level is high, the image forming device can set a password to the box.

Further, in the present embodiment, the security level is determined based on whether the password is set to the box. In another embodiment, the security level can be determined based on whether the data stored in the box is encrypted.

The image processing device according to the exemplary embodiments of the present invention is not limited to the computer which includes the printer controller. For example, a computer device which provides an image processing function such as character recognition and cooperates with an image forming device, or a document management server which cooperates with an image forming device can be employed. Further, the image forming device according to the exemplary embodiments of the present invention is not limited to the MFP or the SFP, and, for example, a facsimile device or a scanning device can also be employed.

The exemplary embodiments of the present invention have been described above in detail. An aspect of the present invention can be applied to a system including a plurality of devices or a single device.

Further, a program implementing the functions of the above-described exemplary embodiment can be directly or remotely provided to a system or a device. Then, an aspect of the present invention can be achieved by the system or the device reading and executing the provided program code. Accordingly, the program code itself which is installed on the computer to implement the function and processing of the present invention, is included within the technical scope the present invention.

In such a case, if the function of the program is included, any form can be employed as the program, for example, an object code, a program implemented with an interpreter, and a script data provided to an OS.

As the recording medium for providing such program code, for example, a floppy disk, a hard disk, an optical disk, and a optical-magneto disk can be employed. Further, a magneto-optical disk, a CD-ROM, a CD-R, a CD-RW, a magnetic tape, a nonvolatile memory card, a ROM, and a DVD (DVD-ROM, DVD-R) can be employed.

In addition, a method of connecting to an Internet site using a browser of a client computer and downloading the computer program itself of the present invention or a file which further includes an automatic installation function, onto a recording medium such as a hard disk and the like can be provided. Further, the program code constituting the program according to the present invention can be divided into a plurality of files, and each file can be downloaded from different home pages. That is, a WWW server which allows a plurality of users to download the program for realizing the function and processing of the present invention with the computer is also included in the claims of the present invention.

Further, the program according to the present invention can be encrypted and stored on a storage medium such as a CD-ROM, and distributed to the users. A user who has cleared prescribed conditions is allowed to download key information for decrypting the cipher from a home page through the Internet. Using the key information, the user can execute the encrypted program, and the program is installed on the computer.

Further, the function according to the embodiments described above can be realized, based on an instruction according to the program code, by an OS (operating system) and the like working on the computer executing a part or the whole of the actual processing.

Further, it is also included in the claims of the present invention that the program code according to the present invention is written on a memory provided in a function enhancing unit of a PC, and based on the program, the CPU or the like provided in the function enhancing unit executes a part or the whole of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-207160 filed on Jul. 28, 2006, which is hereby incorporated by reference herein in its entirety.

What is claimed is:

1. A system comprising an image processing apparatus and a printing apparatus,
the image processing apparatus comprising:
an input unit configured to input a print job from a user;
a first storage unit configured to store image data of the input print job; and
a transmitting unit configured to transmit the image data stored in the first storage unit to the printing apparatus;
the printing apparatus comprising:
a receiving unit configured to receive the image data;
a printing unit configured to print an image based on the received image data;
a second storage unit configured to store the image data received by the receiving unit; and
a deleting unit configured to delete the image data stored in the second storage unit in a case where the printing unit prints an image based on the received image data,
wherein the image processing apparatus comprises a control unit configured to delete the image data in the first storage unit based upon receiving an indication from the printing apparatus that the deleting unit deletes the image data stored in the second storage unit.

2. A system according to claim 1, wherein the image processing apparatus and the printing apparatus are connected via a network.

3. A system according to claim 1, wherein the control unit deletes the image data stored in the first storage unit, based on a deleting method notified by the printing apparatus.

4. A system according to claim 3, wherein the deleting method is (i) logically deleting the image data, (ii) logically deleting the image data and writing a specific value on a region used by the image data, (iii) logically deleting the image data and writing random values on a region used by the image data, (iv) logically deleting the image data and writing random values more than once on a region used by the image data.

5. A system according to claim 1, wherein the control unit deletes the image data in the first storage unit, in response to notification of completion of the printing from the printing apparatus.

6. A system according to claim 1, wherein the first storage unit stores the image data for re-printing.

7. A system according to claim 1, wherein the print job input by the input unit includes PDL data, and wherein the first storage unit stores image data converted from PDL data.

8. A system comprises an image processing apparatus and a printing apparatus, the image processing apparatus comprising:
an input unit configured to input a print job from a client;
a first storage unit configured to store image data of the input print job; and
a transmitting unit configured to transmit the image data stored in the first storage unit to the printing apparatus;
the printing apparatus comprising:
a receiving unit configured to receive the image data;
a printing unit configured to print an image based on the received image data; and
a second storage unit configured to store the image data received by the receiving unit,
wherein the image processing apparatus further comprises a control unit configured to delete the image data in the first storage unit if the image data stored in the second storage unit requires inputting of a password at the printing apparatus, and not delete the image data in the first storage unit if the image data stored in the second storage unit does not require inputting of a password at the printing apparatus.

9. A system according to claim 8, wherein the image processing apparatus and the printing apparatus are connected via a network.

10. A system according to claim 8, wherein the control unit deletes the image data stored in the first storage unit, based on a deleting method notified by the printing apparatus.

11. A system according to claim 10, wherein the deleting method is (i) logically deleting the image data, (ii) logically deleting the image data and writing a specific value on a region used by the image data, (iii) logically deleting the image data and writing random values on a region used by the image data, or (iv) logically deleting the image data and writing random values more than once on a region used by the image data.

12. A system according to claim 8, wherein the control unit deletes the image data in the first storage unit, in response to notification of completion of the printing from the printing apparatus.

13. A system according to claim 8, wherein the first storage unit stores the image data for re-printing.

14. A system according to claim 8, wherein the print job input by the input unit includes PDL data, and wherein the first storage unit stores image data converted from the PDL data.

15. A system comprising an image processing apparatus and a printing apparatus,
the image processing apparatus comprising:
an input unit configured to input a print job from a client;
a first storage unit configured to store image data of the input print job; and
a transmitting unit configured to transmit the image data stored in the first storage unit to the printing apparatus;
the printing apparatus comprising:
a receiving unit configured to receive the image data;
a printing unit configured to print an image based on the received image data; and
a second storage unit configured to store the image data received by the receiving unit,
wherein the image processing apparatus comprises a control unit configured to delete the image data in the first storage unit if the image data stored in the second storage unit requires inputting of a password at the printing apparatus, and
wherein the image data remains in the first storage unit if the image data stored in the second storage unit does not require inputting of a password at the printing apparatus.

16. A system according to claim 15, wherein the image processing apparatus and the printing apparatus are connected via a network.

17. A system according to claim 15, wherein the control unit deletes the image data stored in the first storage unit, based on a deleting method notified by the printing apparatus.

18. A system according to claim 17, wherein the deleting method is (i) logically deleting the image data, (ii) logically deleting the image data and writing a specific value on a region used by the image data, (iii) logically deleting the image data and writing random values on a region used by the image data, or (iv) logically deleting the image data and writing random values more than once on a region used by the image data.

19. A system according to claim 15, wherein the control unit deletes the image data in the first storage unit, in response to notification of completion of the printing from the printing apparatus.

20. A system according to claim 15, wherein the first storage unit stores the image data for re-printing.

21. A system according to claim 15, wherein the print job received by the first receiving unit includes PDL data, and wherein the first storage unit stores image data converted from the PDL data.

22. A system comprising an image processing apparatus and a printing apparatus,
the image processing apparatus comprising:
an input unit configured to input a first print job and/or a second print job from a client, the first print job being capable of printing without entering a password at the printing apparatus and the second print job being necessary to enter a password for printing an image at the printing apparatus;
a first storage unit configured to store image data of the first and/or second print jobs; and
a transmitting unit configured to transmit the image data stored in the first storage unit to the printing apparatus;
the printing apparatus comprising:
a receiving unit configured to receive the image data;
a printing unit configured to print the image data received by the receiving unit;
a second storage unit configured to store the image data received by the receiving unit in a case where the received image data is image data of the second print job, wherein the image data stored in the second storage unit is printed by the printing unit in response to entering a password by a user at the printing apparatus; and
a deleting unit configured to delete the image data stored in the second storage unit in a case where the printing unit prints an image based on the received image data,
wherein the image processing apparatus comprises a control unit configured to delete the image data in the first storage unit based upon receiving an indication from the printing apparatus that the deleting unit deletes the image data stored in the second storage unit.

23. A system according to claim 22, wherein the image processing apparatus and the printing apparatus are connected via a network.

24. A system according to claim 22, wherein the control unit deletes the image data stored in the first storage unit, based on a deleting method notified by the printing apparatus.

25. A system according to claim 24, wherein the deleting method is (i) logically deleting the image data, (ii) logically deleting the image data and writing a specific value on a region used by the image data, (iii) logically deleting the image data and writing random values on a region used by the image data, or (iv) logically deleting the image data and writing random values more than once on a region used by the image data.

26. A system according to claim 22, wherein the control unit deletes the image data in the first storage unit, in response to notification of completion of the printing from the printing apparatus.

27. A system according to claim 22, wherein the first storage unit stores the image data for re-printing.

28. A system according to claim 22, wherein the print job input by the input unit includes PDL data, and wherein the first storage unit stores image data converted from the PDL data.

* * * * *